US010069806B2

(12) United States Patent
Hitchcock et al.

(10) Patent No.: US 10,069,806 B2
(45) Date of Patent: *Sep. 4, 2018

(54) SECURE TRANSFER AND USE OF SECRET MATERIAL IN A SHARED ENVIRONMENT

(71) Applicant: Amazon Technologies, Inc., Seattle, WA (US)

(72) Inventors: Daniel Wade Hitchcock, Bothell, WA (US); Darren Ernest Canavor, Redmond, WA (US); Tushaar Sethi, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/688,255

(22) Filed: Aug. 28, 2017

(65) Prior Publication Data

US 2018/0007020 A1 Jan. 4, 2018

Related U.S. Application Data

(63) Continuation of application No. 14/831,341, filed on Aug. 20, 2015, now Pat. No. 9,774,573, which is a continuation of application No. 13/763,033, filed on Feb. 8, 2013, now Pat. No. 9,141,769.

(51) Int. Cl.
| | |
|---|---|
| *H04L 29/06* | (2006.01) |
| *G06F 21/62* | (2013.01) |
| *H04L 9/08* | (2006.01) |
| *G06F 21/10* | (2013.01) |
| *H04L 9/32* | (2006.01) |
| *H04L 9/14* | (2006.01) |

(52) U.S. Cl.
CPC .......... *H04L 63/0435* (2013.01); *G06F 21/10* (2013.01); *G06F 21/62* (2013.01); *H04L 9/0825* (2013.01); *H04L 9/0877* (2013.01); *H04L 9/0891* (2013.01); *H04L 9/0897* (2013.01); *H04L 9/14* (2013.01); *H04L 9/3234* (2013.01); *H04L 9/3268* (2013.01); *H04L 63/0823* (2013.01)

(58) Field of Classification Search
CPC .................................................. H04L 63/0435
USPC ......................................................... 713/158
See application file for complete search history.

(56) References Cited

U.S. PATENT DOCUMENTS

2002/0199118 A1* 12/2002 Yardley ................... G06F 21/10
726/4

* cited by examiner

*Primary Examiner* — Longbit Chai
(74) *Attorney, Agent, or Firm* — Thomas | Horstemeyer, LLP; Michael J. D'Aurelio; Jason M. Perilla

(57) ABSTRACT

Aspects related to the secure transfer and use of secret material are described. In one embodiment, an encrypted secret key and encrypted revocation data are imported into a trusted execution environment and decrypted with private provider and vendor keys. In this manner, a provider of cryptographic processes is not exposed to the secret key or revocation data of a customer, as the secret key and revocation data are decrypted and stored within the trusted execution environment but not accessed in an unencrypted form. In turn, the provider can receive various instructions to perform cryptographic operations on behalf of the customer. Based on the outcome of a revocation check using the revocation data, the instructions can be performed by the trusted execution environment.

20 Claims, 8 Drawing Sheets

SECURE TRANSFER AND USE OF SECRET MATERIAL IN A SHARED ENVIRONMENT

CROSS-REFERENCE TO RELATED APPLICATIONS

This application is a continuation of U.S. Non-Provisional patent application Ser. No. 14/831,341, filed Aug. 20, 2015, which is a continuation of U.S. Non-Provisional patent application Ser. No. 13/763,033, filed Feb. 8, 2013, now U.S. Pat. No. 9,141,769 the entire contents of both of which applications are hereby incorporated herein by reference.

BACKGROUND

Generally, a trusted execution environment or hardware security module is a device for processing and securely maintaining digital keys, securely generating keys, securely performing cryptographic processes, and/or accelerating cryptographic processes. A hardware security module, when configured to adhere to certain access permission requirements, requires strong authentication before permitting access to the secure services and operations provided by the module. Hardware security modules devices may be embodied in various forms including computer plug-in cards and network devices coupled to servers via secure networks and, in certain aspects, provide both digital and physical protection for digital key materials from unauthorized use and access.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
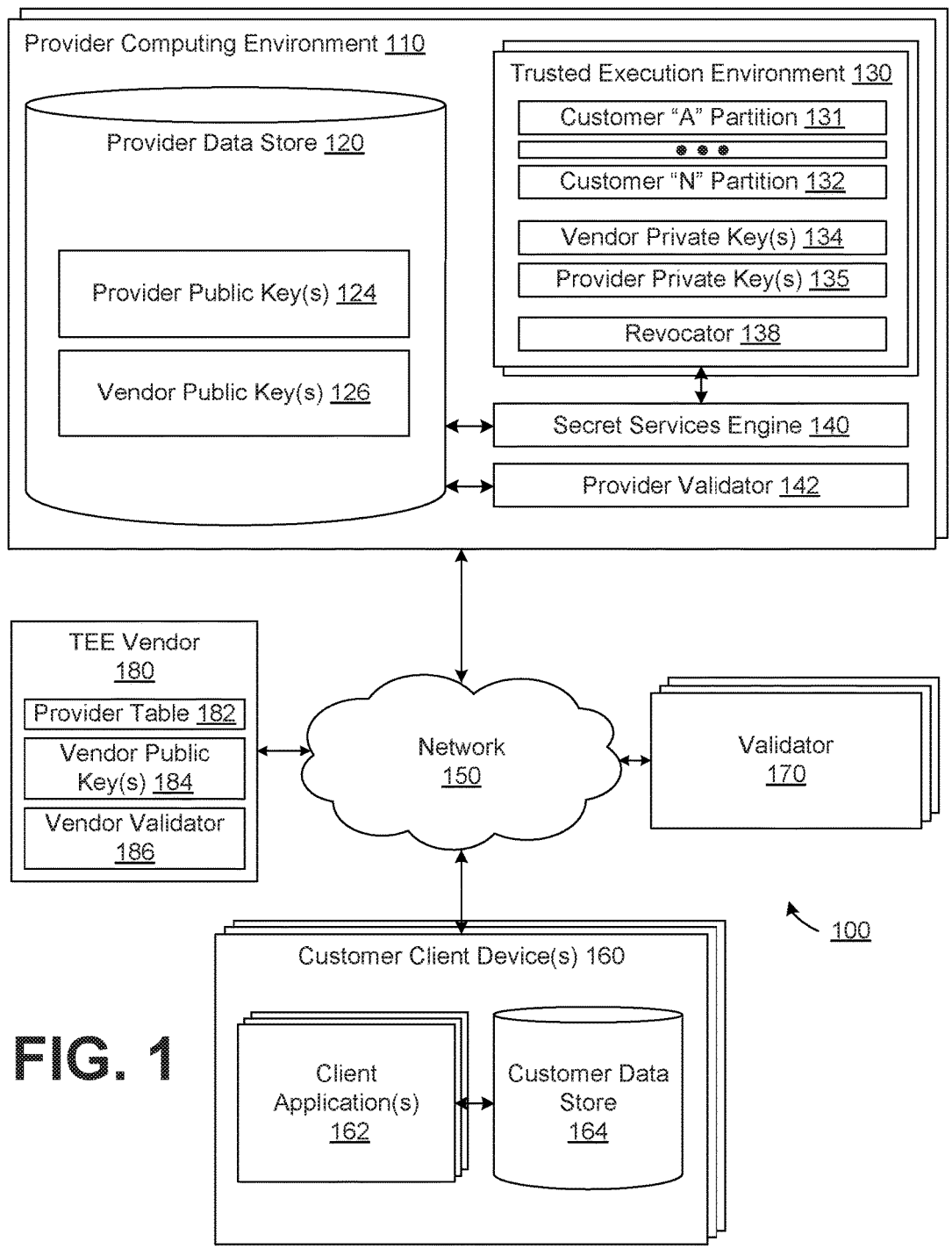
FIG. 1 illustrates a networked environment for the secure transfer and use of secret material in a shared environment according to various embodiments of the present disclosure.

A hardware security module (HSM) comprises a trusted execution environment for processing and securely maintaining digital keys, securely generating keys, securely performing cryptographic processes, and/or accelerating cryptographic processes. An HSM, when configured by certain access permission requirements, requires strong authentication before permitting access to the secure services and operations of the module. It is noted that, however, the use and maintenance of an HSM is costly, requires specialized knowledge, and adds a significant amount of complexity to a processing system.

Thus, in many circumstances, entities that rely upon cryptographic processes may wish to rely upon a cryptographic processing vendor or provider to outsource the overhead associated with such processing. However, a customer entity may be reluctant to share secret key materials with a vendor or provider of cryptographic services, with the reservation that such secret materials may be maliciously or inadvertently shared with others, leading to a security breach. Depending upon the scope of use of secret key materials, a security breach may result in costly efforts to implement a new security system with new security keys.

To address the security limitations in connection with sharing secret key materials with a cryptographic services provider, aspects of the embodiments described herein rely upon certain logic, functions, and processes that permit the secure transfer of secret key material to a cryptographic services processing vendor and secure use of the secret key material by the vendor. Additionally, the techniques result in secure transfer and use of the secret key material without the vendor having any actual access to it. In this sense, a cryptographic services processing vendor has reduced exposure to the secret key material of its customers and, thus, lower exposure to liability. Thus, a "secret services" provider, such as a cloud service provider or intra-organizational shared services group, is able to perform operations with secret keys on behalf of customers (potentially many customers simultaneously) at high volumes and performance, without the liability associated with custodianship of customer secret key materials.

According to aspects described herein, the secure transfer and use of secret key material is described. In one embodiment, vendor and provider keys are provided to a customer and an encrypted key is received in return. The encrypted key may include a customer key encrypted by the vendor and provider keys. The encrypted key is decrypted with the provider key and, while still encrypted by the vendor key, imported into a security module for the secret decryption and storage of the customer key. In this manner, a provider of cryptographic processes is not exposed to the customer key, as it is stored within the security module and cannot be accessed in an unencrypted form. In turn, the provider may receive various instructions to perform cryptographic operations on behalf of the customer, and those instructions may be performed secretly via the security module.

In the following discussion, a general description of a system for the secure transfer and use of secret key material and its components is provided, followed by a discussion of the operation of the same.

FIG. 1 illustrates a networked environment 100 for the secure transfer and use of secret material in a shared environment according to various embodiments of the present disclosure. The networked environment 100 comprises a provider computing environment 110, a network 150, a customer client device 160 (or client device 160), a validator 170, and a vendor 180 of trusted execution environments (i.e., TEE vendor 180).

The provider computing environment 110 may be embodied as a computer, computing device, or computing system. In certain embodiments, the provider computing environment 110 may comprise one or more computing devices arranged, for example, in one or more server or computer banks. The computing device or devices may be located at a single installation site or distributed among different geographical locations. For example, the provider computing environment 110 may include a plurality of computing devices that together comprise a cloud computing resource, a grid computing resource, and/or other distributed computing arrangement. In some cases, the provider computing environment 110 may comprise an elastic computing resource where an allotted capacity of processing, network, storage, or other computing-related resources varies over time.

The network 150 may comprise the Internet, intranets, extranets, wide area networks (WANs), local area networks (LANs), wired networks, wireless networks, other suitable networks, or combinations thereof. It is noted that the provider computing environment 110 may communicate with the customer client device 160 over various protocols such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), transmission control protocol (TCP), and/or other protocols for communicating data over the network 150, without limitation. It is further noted that, in certain circumstances, the provider computing environment 110 may communicate with the customer client device 160 using a secure channel over the network 150. Additionally, the client device 160 may communicate with the TEE vendor 180 using a secure channel over the network 150. A secure channel over the network 150 may be established using a cryptographic protocol such as transport layer security (TLS), secure sockets layer (SSL), or other similar cryptographic protocols.

The provider computing environment 110 comprises various functional and/or logic (i.e., device or circuit) elements that may be executed or directed by the provider computing environment 110 according to various embodiments described in further detail below. As illustrated in the example embodiment of FIG. 1, the provider computing environment 110 comprises a provider data store 120, a trusted execution environment (TEE) 130, a secret services engine 140, and a provider validator 142. According to features described herein, the provider computing environment 110 is configured to securely receive and use secret materials provided by customers. In this context, the provider computing environment 110 comprises a cryptographic services processing vendor or provider.

In various environments, the TEE 130 comprises one or a plurality of trusted execution environments. In one embodiment, each trusted execution environment may comprise a hardware security module. Generally, the TEE 130 provides secure storage for secret materials, such as secret cryptographic key materials, used for encrypting and decrypting data in various cryptographic operations. Thus, the TEE 130 may comprise a group or "world" of secret and secure processing modules, spanning more than one TEE device. The TEE 130 group may rely upon one or more global or individual access permission models for one or more customers. Generally, the TEE 130 may operate on symmetric keys, asymmetric key pairs, and certificates used in key cryptography. The TEE 130 is designed such that it does not allow for the exportation of secret key materials or similar secret data in plaintext form, even when migrating between TEEs or performing backup operations. In some embodiments, the TEE 130 provides a type of trusted environment hardware cryptographic accelerator. The hardware acceleration provided by the TEE 130 is especially useful, for example, when operating with 1024-bit or 2048-bit key operations.

In various embodiments, the validator 170 may comprise a third party or a service or component of either the provider computing environment 110 or the TEE vendor 180. Generally, given a key identifier, for example, the validator 170 verifies that a certain key is valid and not revoked. Further aspects and functions of the validator 170 are described below.

The TEE vendor 180 comprises a manufacturer of hardware security modules. In one embodiment, the TEE vendor 180 is a manufacturer of the TEE 130. As a manufacturer and vendor of TEE devices, the TEE vendor 180 may maintain a provider table 182 of providers or customers and a list of vendor public keys 184 of TEE devices. That is, the provider table 182 includes a list of customers that purchased TEE devices manufactured by the TEE vendor 180, and the list of vendor public keys 184 may include a list of public key components of asymmetric key pairs securely stored and used by TEE devices manufactured by the TEE vendor 180. Alternatively, the vendor public keys 184 may further include data to verify that the vendor public keys were validly issued and active, according to records of the TEE vendor 180.

For the provider computing environment 110 to securely receive and use secret materials of a customer for cryptographic processes, the customer client device 160 is provided with vendor and provider keys by the provider computing environment 110 and/or the TEE vendor 180. In certain embodiments, the vendor and provider keys may comprise public key components of asymmetric key pairs. In turn, the client device 160 encrypts secret customer material, such as symmetric or asymmetric key materials, using the public vendor and provider keys, to provide double encrypted secret material. The client device 160 then forwards the double encrypted secret material to the provider computing environment 110. The client device 160 may also forward metadata to the provider computing environment 110 along with the double encrypted key. In various embodiments, the metadata includes data that indicates that certain validations have occurred at the client device 160 and an indicator or identifier of the provider and vendor keys used to encrypt the customer's secret materials.

At the provider computing environment 110, in one embodiment, the secret services engine 140 decrypts the double encrypted secret material with a private provider key. The private provider key comprises the private component of the public provider key relied upon by the client device 130. After decrypting the double encrypted secret material with the private provider key, the result comprises the customer secret material encrypted by the public vendor key (i.e., vendor encrypted secret material). The secret services engine 140 then imports the vendor encrypted secret material into the TEE 130 for further processing. Afterwards, within the secure processing area of the hardware security module 130, the secret services engine 140 directs the TEE 130 to decrypt the customer secret material by decrypting the vendor encrypted secret material with the private vendor key of the TEE 130. The private vendor key comprises the private component of the public vendor key relied upon by the client device 130. It is noted that, by design, the provider computing environment 110 is not provided access to the secret material of the customer in an unencrypted or plaintext form.

In another embodiment, at the provider computing environment 110, the secret services engine 140 receives the double encrypted secret material from the client device 160 and imports the double encrypted secret material into the TEE 130 for processing. Afterwards, within the secure processing area of the hardware security module 130, the secret services engine 140 directs the TEE 130 to decrypt the customer secret material by decrypting the double encrypted secret material with the private provider and vendor keys stored within the TEE 130. Again, the provider computing environment 110 is not provided access to the secret material of the customer in an unencrypted or plaintext form.

The provider data store 120 may be representative of a plurality of data stores arranged in various configurations at one or multiple geographic locations, among embodiments. Among other data, data structures, and/or programs, in various embodiments, the provider data store 120 stores one or more provider public keys 124 and one or more vendor public keys 126. In additional aspects, the data stored in the provider data store 120 is associated with the operation of the various functional or application logic elements of the provider computing environment 110, as described in further detail below.

The customer client device 160 is representative of one or a plurality of client devices of customers. The client device 160 may comprise any processor or computer based device or system, including those embodied in the form of a desktop or server computer, among other example computing devices and systems. The client device 160 may execute applications including client application 162, which is representative of one or a plurality of applications executing on the customer client device 160.

The client application 162 may include one or more applications executing concurrently. In certain aspects, one or more of the applications 162 rely upon the generation and communication of data in a secure manner. For example, the application 162 may comprise an application for payment processing, application that operates with personal information (e.g., health care information or financial information), or application related to the distribution of data protected by intellectual property rights. The client application 162 may refer to and access data stored in the customer data store 164. The data store 164 may include customer data that must be securely communicated and protected by the client application 162. Other features and functions of the customer client device 160 are described in further detail below.

Next, a further description of the operation of the various components of the networked environment 100 is provided with reference to FIGS. 1, 2A, 2B, 3A, 3B, and 3C.

As noted above, the networked environment 100 is designed such that the customer client device 160 may rely upon the provider computing environment 110 to perform certain cryptographic processes on behalf of the customer client device 160 using secret material provided by the customer client device 160. The cryptographic processes may include, for example, one or a combination of encrypting, decrypting, translating, hashing, signing, or validating a signature. It is noted, however, that other cryptographic processes are within the scope and spirit of the embodiments described herein. In one embodiment, the secret material of the customer comprises a public key of an asymmetric key pair, for example. However, other secret material of the customer is within the scope and spirit of the embodiments described herein.

Before the provider computing environment 110 can operate using the secret material of the customer client device 160, the secret material must be securely transferred from the customer client device 160 to the provider computing environment 110. To achieve this secure transfer, the provider computing environment 110 and/or the TEE vendor 180 provide the customer client device 160 with public vendor and provider keys. The public vendor key, $K_{PubVendor}$, is associated with the TEE 130. In one embodiment $K_{PubVendor}$ is the public key of an asymmetric key pair of the TEE 130. Similarly, in one embodiment, the public provider key, $K_{PubProvider}$, is the public key of an asymmetric key pair of the provider computing environment 110.

The secret services engine 140 may retrieve the public vendor and provider keys from the provider data store 120 (i.e., from storage locations 124 and 126), and forward them to the customer client device 160 via the network 150. In another embodiment, the TEE vendor 180 may forward the public vendor key to the client device 160 via the network 150. In turn, the client application 162 of the customer client device 160 encrypts secret materials of the customer using the received public vendor and provider keys. In the exemplary embodiment described above, the vendor and provider keys each comprise a public key of an asymmetric key pair. However, in other embodiments, the vendor and provider keys may comprise symmetric keys, for example, or other types of keys or certificates.

After the customer client device 160 receives the public vendor and provider keys, but before the customer client device 160 encrypts any secret customer material, in certain embodiments, the customer client device 160 validates the public vendor and provider keys. For example, the customer client device 160 may contact the validator 170, and the validator 170 may verify that the keys are currently valid for use. Alternatively or additionally, the provider validator 142 of the TEE 130 may verify that the public provider key is currently valid for use. Similarly, the vendor validator 186 of the TEE vendor 180 may verify that the public vendor key is currently valid for use.

In one embodiment, the customer client device 160 contacts the TEE vendor 180 to verify that the received vendor key was actually and validly issued for use. The TEE vendor 180 may refer to the provider table 182 and/or the vendor public keys 184, to verify that the public vendor key received by the client device 160 was validly issued to a trusted execution environment owned in connection with the provider computing environment 110. Thus, the customer client device 160 is able to validate that the public vendor and provider keys are valid and authorized for use, before encrypting any sensitive customer material and forwarding that material to the provider computing environment 110.

For validation of the public vendor and provider keys, the validation mechanism is selected for resistance to DNS spoofing, "man-in-the-middle" (MITM) attacks, and similar security attacks, such that the customer has a degree of assurance that the validations are legitimate. For example, end-to-end validation, TLS/SSL server authentication, and similar mechanisms may be used in certain embodiments to verify an identity of a validation endpoint. Proof-of-possession ceremonies over such a channel (e.g., signing, encryption based on private key possession by the TEE vendor 180, etc.) may also be used to provide even stronger validation.

Figure 2A:
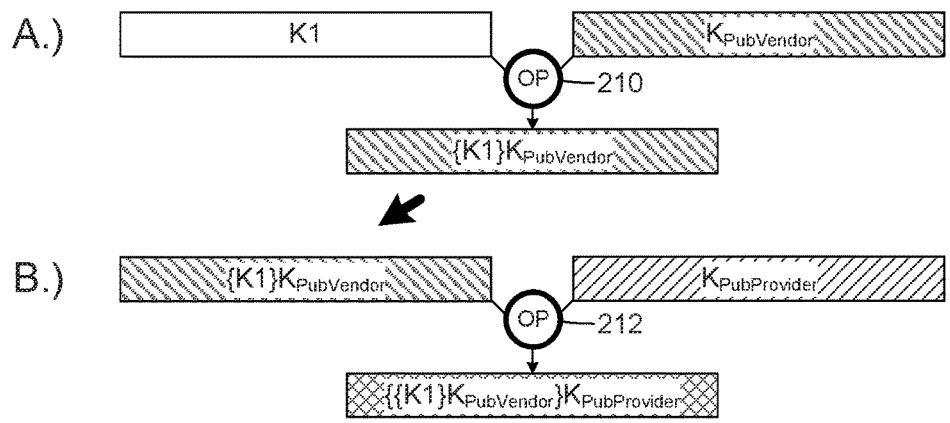
FIG. 2A illustrates example states for encryption of secret material by a client device of the networked environment of FIG. 1 according to various embodiments of the present disclosure.

FIG. 2A illustrates example states for the encryption of secret material K1 by the customer client device 160 of the networked environment 100 of FIG. 1 according to various embodiments of the present disclosure. The secret material K1 is described below as secret key material, although other types of secret material are within the scope and spirit of the embodiments described herein. In the client device 160, the client application 162 encrypts the customer key material K1 with the public vendor key $K_{PubVendor}$, and then encrypts the result, $\{K1\}K_{PubVendor}$, with the public provider key $K_{PubProvider}$, to arrive at a double encrypted key $\{\{K1\}K_{PubVendor}\}K_{PubProvider}$. Thus, it is noted that the key material K1 is multiple-encrypted (i.e., encrypted by more than one key). In the embodiment illustrated in FIG. 2A, the key material K1 is double encrypted by the public vendor and provider keys in a nested fashion. That is, the client application 162 encrypts the customer key material K1 by the public vendor key $K_{PubVendor}$ according to the encryption operation 210, and then encrypts $\{K1\}K_{PubVendor}$ by the provider public provider key $K_{PubProvider}$ according to the encryption operation 212. In various environments, the encryption operations 210 and 212 may comprise any well-known encryption operation such as an XOR or other operation.

The customer client device 160 then forwards the double encrypted key $\{\{K1\}K_{PubVendor}\}K_{PubProvider}$ to the provider computing environment 110 via the network 150. It is noted that, in certain embodiments, the encryption of $\{K1\}K_{PubVendor}$ by the public provider key $K_{Provider}$ may be replaced by the communication of $\{K1\}K_{PubVendor}$ via a secure channel of the network 150. Use of the secure channel, in that case, may take the place of the encryption of $\{K1\}K_{PubVendor}$ by the public provider key $K_{PubProvider}$. For example, before communicating $\{K1\}K_{PubVendor}$ via the network 150, the provider computing environment 110 and the customer client device 160 may establish a secure channel between each other using TLS, SSL, or other similar cryptographic network communications protocols.

Figure 2B:
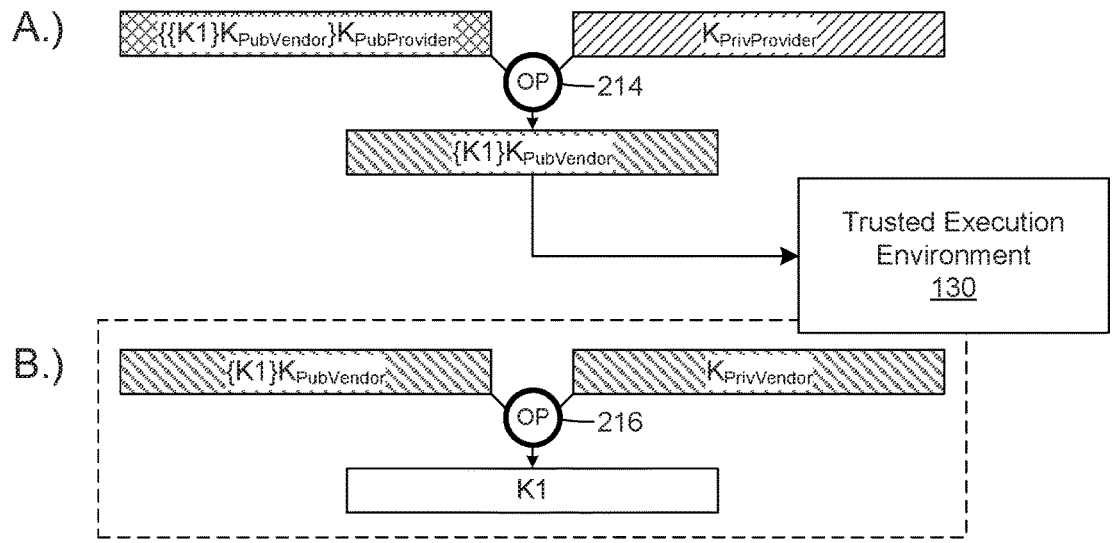
FIG. 2B illustrates example states for decryption of an encrypted secret material by a provider computing environment of the networked environment of FIG. 1 according to various embodiments of the present disclosure.

FIG. 2B illustrates example states for decryption of the double encrypted key $\{\{K1\}K_{PubVendor}\}K_{PubProvider}$ by the provider computing environment 110 of the networked environment 100 of FIG. 1 according to various embodiments of the present disclosure. First, the secret services engine 140 decrypts the double encrypted key $\{\{K1\}K_{PubVendor}\}K_{PubProvider}$ with the private provider key $K_{PrivProvider}$, to provide a vendor encrypted key $\{K1\}K_{PubVendor}$. The decryption operation 214 may comprise any well-known decryption operation such as an XOR or other operation.

In the embodiment illustrated in FIG. 2B, after extracting the vendor encrypted key $\{K1\}K_{PubVendor}$, the secret services engine 140 imports the vendor encrypted key $\{K1\}K_{PubVendor}$ into the TEE 130. It is noted that, in embodiments where $\{K1\}K_{PubVendor}$ is communicated by a secure channel via the network 150 without being encrypted by the provider key $K_{PubProvider}$, the secret services engine 140 may directly import the vendor encrypted key $\{K1\}K_{PubVendor}$ into the TEE 130.

After importing, the secret services engine 140 directs the TEE 130 to extract the customer key K1 from the vendor encrypted key $\{K1\}K_{PubVendor}$ by decrypting the vendor encrypted key $\{K1\}K_{PubVendor}$ with the private vendor key $K_{PrivVendor}$. Thus, the TEE 130 extracts the customer key K1 by the decryption operation 216, as illustrated in FIG. 2B. The decryption operation 216 may comprise any well-known decryption operation such as an XOR or other operation.

The secret services engine 140 further directs the TEE 130 to store the customer key K1 within the customer partition "A" 131 of the TEE 130, for example. Referring back to FIG. 1, the TEE 130 comprises various customer partitions including partitions "A" 131 to "N" 132. Each of the customer partitions may be reserved for a respective customer, to maintain separation among customers. Each of the customer partitions may be used to store secret key materials of respective customers of the provider computing environment 110.

Thus, a trusted execution environment or group of trusted execution environments may be relied upon by the provider computing environment 110 to service more than one customer. In various embodiments, the customer partition "A" 131 may be designated or assigned to a certain customer or client device, and the customer or client device may specify use of that partition for the storage of its secret materials. Similarly, the customer or client device may specify the use of a certain TEE, when the TEE 130 comprises several TEEs.

Once the customer key K1 is stored in the TEE 130, the provider computing environment 110 is able to execute cryptographic processes using the customer key K1 on behalf of the customer. As discussed below, before performing any cryptographic processes on secret key material received from a customer, the provider computing environment 110 may confirm that the material has been stored in the TEE 130. This confirmation may be by way of a confirmation message to the client device 160.

It is noted that the provider computing environment 110 has no access to the customer key K1 in a compromised (e.g., plaintext) form. Instead, the provider computing environment 110 passes the customer key K1 to the TEE 130 in an encrypted form. Thus, the provider computing environment 110 is not exposed to the customer key K1, and the customer need not expose the customer key K1 to the provider computing environment 110. In FIG. 2B, this secret decryption and storage of the customer key K1 is illustrated by the dashed box surrounding the decryption operation 216, as this operation is performed by and completely within the TEE 130. Further, the trusted environment design of the TEE 130 ensures that neither the customer key K1 nor the private key compliment $K_{PrivVendor}$ to the public component of the vendor key $K_{PubVendor}$ is accessible to the provider computing environment 110 at any time.

Thus, by design, the provider computing environment 110 cannot extract the customer key K1 from the TEE 130 to distribute or exploit it. As such, the customer of the provider computing environment 110 need to worry about exposing the customer key K1 to the provider computing environment 110. In certain circumstances, the provider computing environment 110 may backup customer key materials among TEEs, to protect against catastrophic loss. In certain embodiments where the TEE 130 includes several TEE modules, for example, the modules may be operated at different geographic locations as a fault-safe security measure.

Once a customer's secret materials are stored within the TEE 130, the customer can forward one or more cryptographic operation instructions from the client device 160 to the provider computing environment 110. In one embodiment, an instruction to perform a cryptographic operation includes an operation identifier of the cryptographic operation to be performed and a key identifier that identifies the customer secret key to be used. As noted above, example cryptographic operations to be performed by the provider computing environment 110 on behalf of the customer client device 160 include encrypting, decrypting, translating, hashing, signing, or validating a signature. The provider computing environment 110 may interact or communicate with the TEE 130 using a standard TEE application programming interface (API), such as the PKCS #11 or another similar public key cryptography standard (PKCS) interface, to communicate instructions for performance of the operation.

In other aspects, the customer client device 160 may forward revocation data to the provider computing environment 110, for example, to define instructions, conditions, or a timeframe related to determining whether a customer's secret key material should be revoked (or are valid) for use. For example, the revocation data may specify a period of time of validity or a network address at which the continued validity of key materials may be checked, along with a token for access to an interface at the address.

Figure 3A:
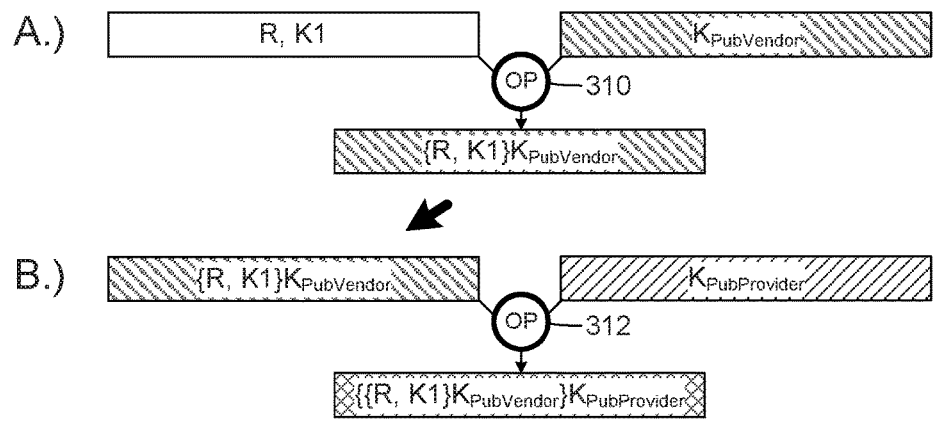
FIG. 3A illustrates example states for encryption of revocation data and secret material by the client device of the networked environment of FIG. 1 according to various embodiments of the present disclosure.
Figure 3B:
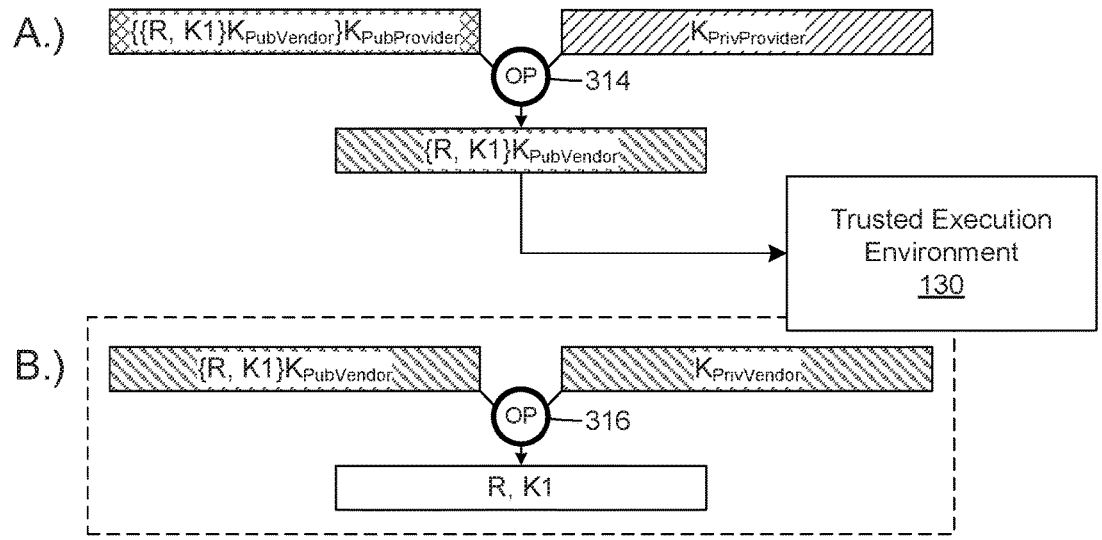
FIG. 3B illustrates example states for decryption of encrypted revocation data and secret material by the provider computing environment of the networked environment of FIG. 1 according to various embodiments of the present disclosure.

In this context, FIG. 3A illustrates example states for encryption of revocation data and secret material by the customer client device 160 of the networked environment 100 of FIG. 1, and FIG. 3B illustrates example states for decryption of encrypted revocation data and the secret material by the provider computing environment 110 of the networked environment 100 of FIG. 1.

In FIG. 3A, the customer key K1 is similar to the customer key K1 of FIG. 2A, the public vendor key $K_{PubVendor}$ is similar to the public vendor key of FIG. 2A, and the public provider key $K_{PubProvider}$ is similar to the public provider key of FIG. 2A. Further the encryption operations 310 and 312 are similar to the encryption operations 210 and 212 of FIG. 2A, and the decryption operations 314 and 316 are similar to the decryption operations to 214 and 216 of FIG. 2A. However, as illustrated in FIG. 3A, it is noted that revocation data R is encrypted along with the customer key K1 using both the public vendor and provider keys, to arrive at $\{\{R, K1\}K_{PubVendor}\}K_{PubProvider}$. As with the encrypted key $\{\{K1\}K_{PubVendor}\}K_{PubProvider}$ of FIG. 2A, the encrypted revocation data and key $\{\{R, K1\}K_{PubVendor}\}K_{PubProvider}$ is forwarded from the customer client device 160 to the provider computing environment 110.

In one embodiment, as illustrated in FIG. 3B, the secret services engine 140 decrypts the encrypted revocation data and key $\{\{R, K1\}K_{PubVendor}\}K_{PubProvider}$ with the private provider key $K_{PrivProvider}$, to arrive at $\{R, K1\}K_{PubVendor}$. The secret services engine 140 then imports $\{R, K1\}K_{PubVendor}$ into the TEE 130. After importing, the secret services engine 140 directs the TEE 130 to extract the revocation data R and customer key K1 by decrypting $\{R1, K1\}K_{PubVendor}$ with the private vendor key $K_{PrivVendor}$, as illustrated in FIG. 3B. The secret services engine 140 further directs the TEE 130 to store the revocation data R and the customer key K1 within the customer partition "A" 131 of the TEE 130.

It is noted, again, that the provider computing environment 110 has no actual access to either the revocation data R or the customer key K1. Instead, the provider computing environment 110 passes the revocation data R and the customer key K1 to the TEE 130 in an encrypted form. Thus, the provider computing environment 110 is not exposed and has no access to the revocation data R. This prevents malicious manipulation of the revocation data R by the service provider. As such, the customer can be assured that it maintains control of the revocation of its customer key K1.

It is noted that revocation and requests for revocation of customer keys are coordinated by the revocator 138 of the TEE 130. In certain aspects and embodiments, the revocation data R specifies a "revocation endpoint" along with the customer key K1. For keys associated with certificates, the structure of the certificate (e.g., x.509 or similar profile) may provide a nominal manner of specifying revocation data similar to R, and this approach to revocation may be leveraged for convenience in some embodiments. In this case, the certificate may be used in place of the revocation data R.

In other aspects and embodiments, a TEE-enforced "access block" deactivates the customer key K1 if a TEE revocation check to an R-specified network address succeeds, and a response to the revocation check is "key revoked" (i.e., permanent failure). The TEE revocation check interval may be configurable by the customer or the revocator 138 of the TEE 130, in various embodiments, but the lower and upper bounds may be constrained by the TEE 130 to prevent a cryptographic service provider from failing to honor revocation calls indefinitely. For example, the TEE 130 may require that a revocation check be performed by the revocator 138 at an interval between seconds and days. To address the chance that a malicious cryptographic service provider redirects TEE revocation check traffic to a fraudulent revocation service, the revocation data R may further include server validation data for a server of a revocation service.

Figure 3C:
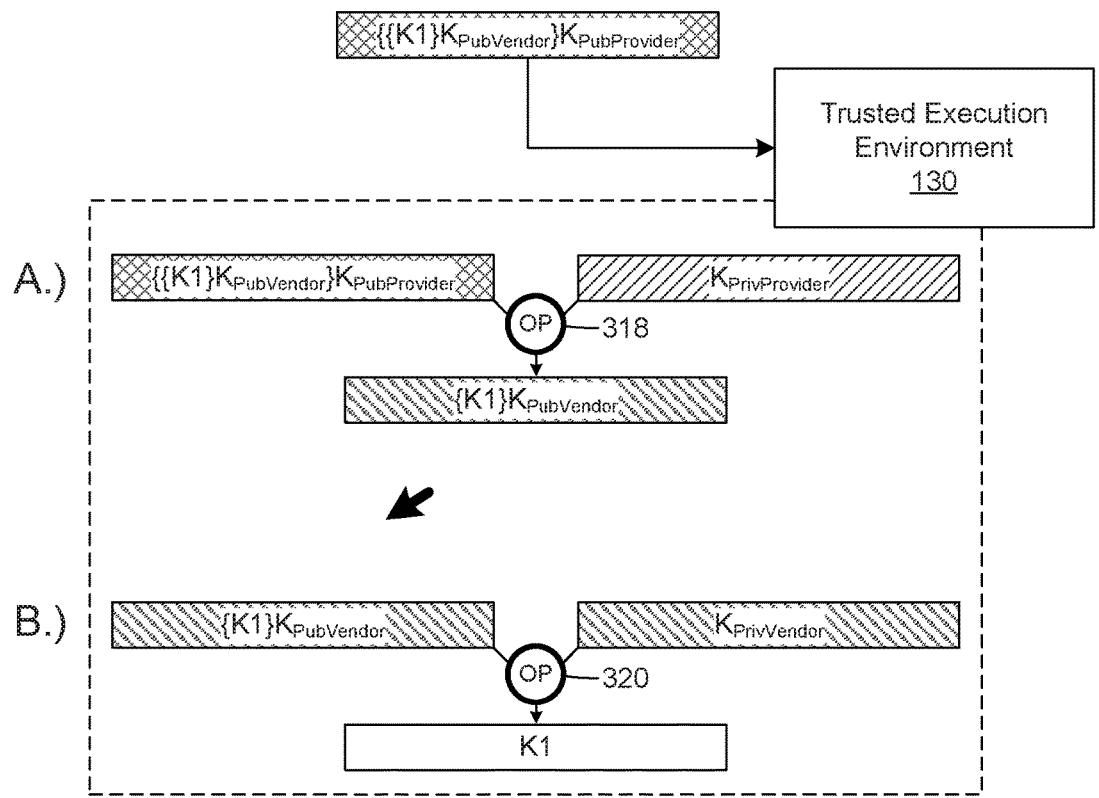
FIG. 3C illustrates example states for decryption of double encrypted secret material by the provider computing environment of the networked environment of FIG. 1 according to various embodiments of the present disclosure.

As an alternative to the decryption technique illustrated in FIG. 2B, FIG. 3C illustrates example states for decryption of double encrypted secret material by the TEE 130 of the provider computing environment 110 in FIG. 1 according to various embodiments of the present disclosure. As compared to FIG. 2B, after receiving the double encrypted key $\{\{K1\}K_{PubVendor}\}K_{PubProvider}$ from the client device 160, the secret services engine 140 imports it into the TEE 130 without decrypting it by the private provider key $K_{PrivProvider}$. The secret services engine 140 then directs the TEE 130 to decrypt the encrypted key $\{\{K1\}K_{PubVendor}\}K_{PubProvider}$ with the private provider key $K_{PrivProvider}$ at decryption operation 318, to provide $\{K1\}K_{PubVendor}$ as a result.

The secret services engine 140 also directs the TEE 130 to generate the customer key K1 by decrypting $\{K1\}K_{PubVendor}$ with the private vendor key $K_{PrivVendor}$ at decryption operation 320, as illustrated in FIG. 3C. The secret services engine 140 also directs the TEE 130 to store the customer key K1 within the customer partition "A" 131 of the TEE 130 or another partition. The provider computing environment 110 still has no actual access to the customer key K1. Instead, the provider computing environment 110 passes the customer key K1 to the TEE 130 in an encrypted form.

Figure 3D:
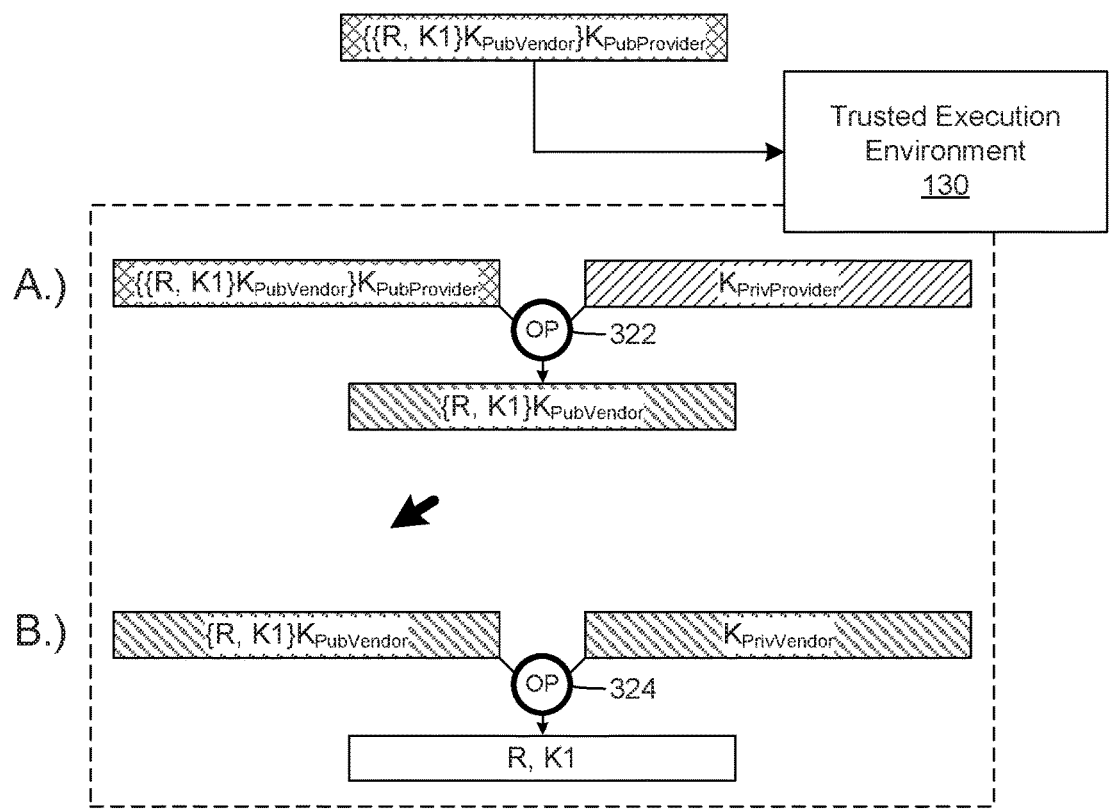
FIG. 3D illustrates example states for decryption of double encrypted secret material and revocation data by the provider computing environment of the networked environment of FIG. 1 according to various embodiments of the present disclosure.

Further, as an alternative to the decryption technique illustrated in FIG. 3B, FIG. 3D illustrates example states for decryption of double encrypted secret material by the TEE 130 of the provider computing environment 110 in FIG. 1 according to various embodiments of the present disclosure. As compared to the embodiment described above in connection with FIG. 3B, after receiving the encrypted revocation data and key $\{\{R, K1\}K_{PubVendor}\}K_{PubProvider}$ from the client device 160, the secret services engine 140 imports it into the TEE 130 without decrypting it by the private provider key $K_{PrivProvider}$. The secret services engine 140 then directs the TEE 130 to decrypt the encrypted revocation data and key $\{\{R, K1\}K_{PubVendor}\}K_{PubProvider}$ with the private provider key $K_{PrivProvider}$ at decryption operation 322, to provide $\{R, K1\}K_{PubVendor}$ as a result.

The secret services engine 140 also directs the TEE 130 to generate the revocation data R and customer key K1 by decrypting $\{R1, K1\}K_{PubVendor}$ with the private vendor key $K_{PrivVendor}$ at decryption operation 324, as illustrated in FIG. 3D. The secret services engine 140 also directs the TEE 130 to store the revocation data R and the customer key K1 within the customer partition "A" 131 of the TEE 130 or another partition. The provider computing environment 110 still has no actual access to either the revocation data R or the customer key K1. Instead, the provider computing environment 110 passes the revocation data R and the customer key K1 to the TEE 130 in an encrypted form.

In other aspects of the embodiments described herein, certain officers, such as domain officers, security officers, or partition officers, may be configured for the TEE 130 using provider-defined K-of-N quorums. In other words, as a further security assurance mechanism, the TEE 130 may be configured to permit particular administrative or access rights to certain officer classes or individuals. Each individual maintains a security card in their possession. The number of security cards associated with an officer or class type is defined by N, and the number of security cards required to gain access to the rights of the officer is defined by K. Thus, K-of-N security cards are required to gain access to the administrative or access rights of a certain officer class. For example, access to the rights of partition officers may require a provider-defined 2-of-3 quorum among the partition officers.

In one embodiment, partition officers may be granted administrative rights to define the customer partitions "A" 131 to "N" 132. However, the partition officers have no administrative or access abilities to export or otherwise obtain (or infer) plaintext customer keys. In exemplary embodiments of the provider computing environment 110, no officer quorum (i.e., domain officers, security officers, or partition officers) have permissions to modify access control lists of the customer partitions "A" 131 to "N" 132.

Figure 4:
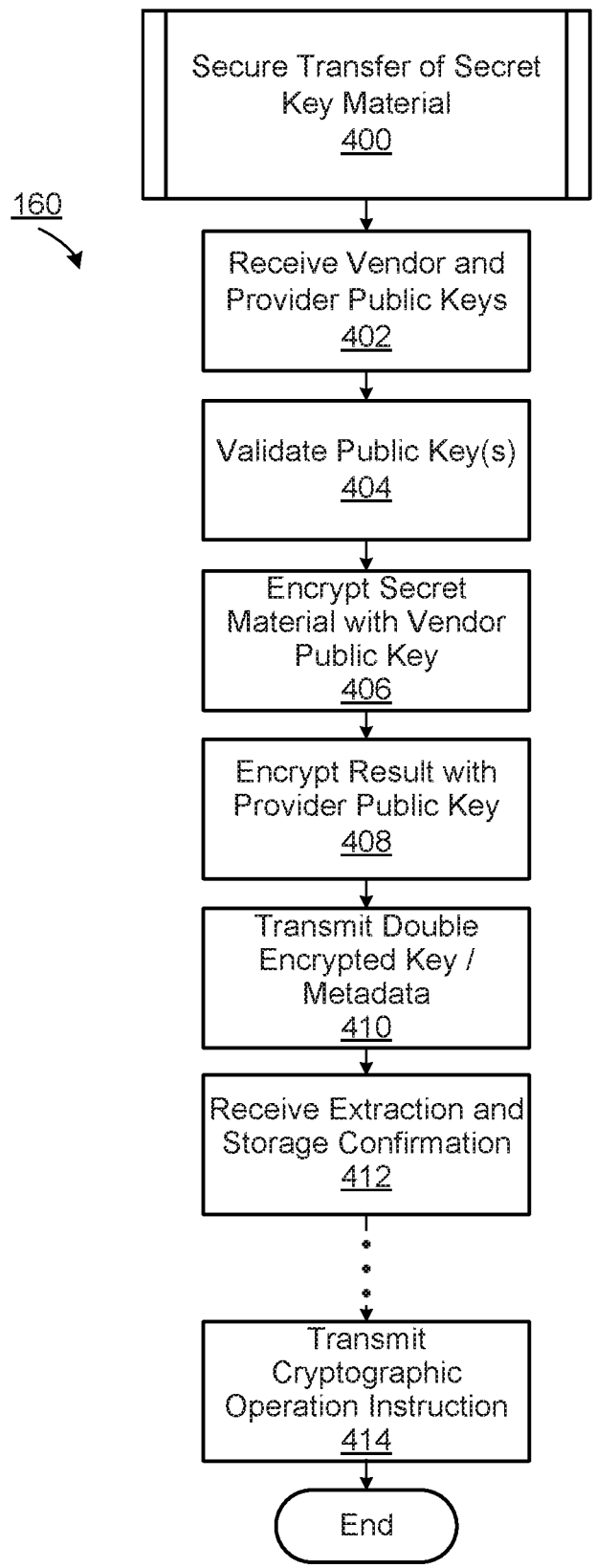
FIG. 4 illustrates an example process flow of the client device in the networked environment of FIG. 1 according to various embodiments of the present disclosure.
Figure 5:
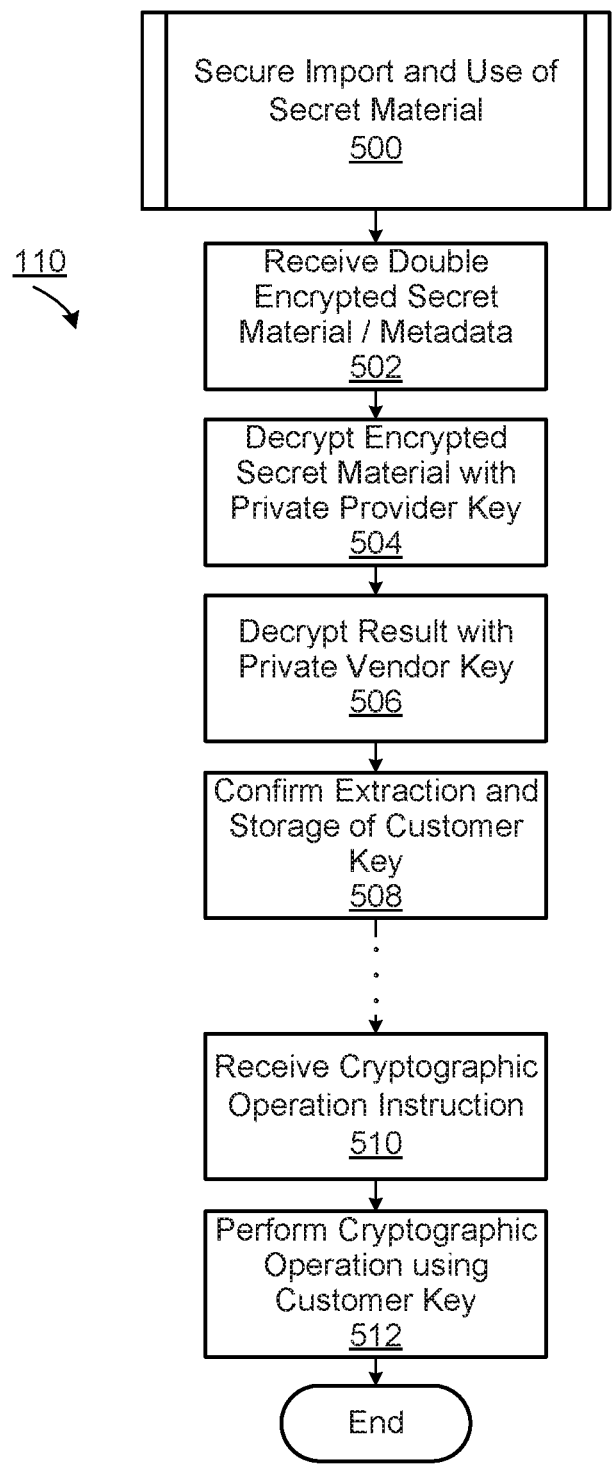
FIG. 5 illustrates an example process flow of the provider computing environment of the networked environment of FIG. 1 according to various embodiments of the present disclosure.

Referring next to FIGS. 4 and 5, flowcharts illustrating example processes performed by the client device 160 and the provider computing environment 110 are provided. It is understood that the flowcharts of FIGS. 4 and 5 provide merely one example of various functional arrangements that may be employed to implement the operations of the client device 160 and the provider computing environment 110, as described herein. In certain aspects, the flowcharts of FIGS. 4 and 5 may be viewed as depicting an example of steps performed by the client device 160 and the provider computing environment 110 according to one or more embodiments.

FIG. 4 illustrates an example process flow of the client device 160 in the networked environment 100 of FIG. 1 according to various embodiments of the present disclosure. Although the process flow 400 is described below in connection with the client device 160, it is noted that the process flow 400 may be performed by other devices.

At reference 402, the customer client device 160 receives public vendor and provider keys. The keys may be received from one or more entities, including the provider computing environment 110 and/or the TEE vendor 180, in various embodiments. As one example, the public vendor key may be received by the client device 160 from the TEE vendor 180, and the public provider key may be received by the provider computing environment 110.

At reference 404, the customer client device 160 contacts one or more of the validator 170, the TEE vendor 180, and the provider computing environment 110 to validate the public keys as being valid. At reference 406, the customer client device 160 encrypts secret materials, such as a secret customer key, for example, with the public vendor key received at reference 402, to provide vendor encrypted secret material as a result. For example, the generation of a vendor encrypted key may be performed based on the encryption of the customer key K1 with the public vendor key $K_{PubVendor}$ according to the example described in connection with FIG. 2A. Additionally, in certain embodiments, vendor encrypted revocation data may be created at reference 406 based on the encryption of revocation data R with the public vendor key $K_{PubVendor}$ according to the example described in connection with FIG. 3A.

Continuing to reference 408, the customer client device 160 encrypts the result from reference 406, the vendor encrypted secret material, with the public provider key, to provide double encrypted secret material. For example, according to the example described in connection with FIG. 2A, the generation of a double encrypted key $\{\{K1\}K_{PubVendor}\}K_{PubProvider}$ may be performed based on the encryption of the vendor encrypted key $\{K1\}K_{PubVendor}$ with the public provider key $K_{PubProvider}$. Additionally, double encrypted revocation data may be generated at reference 408 according to the example described in connection with FIG. 3A.

Once the double encrypted secret material is generated at reference 408, the customer client device 160 transmits the double encrypted secret material to the provider computing environment 110 at reference 410. Based on the multiple-encrypted nature of the secret material transmitted to the provider computing environment 110, the customer client device 160 is able to securely transfers secret materials and/or revocation data to the provider computing environment 110 at reference 410.

At reference 410, the customer client device 160 also prepares and transmits metadata associated with the double encrypted secret material to the provider computing environment 110. The metadata may include an identifier that certain validations have occurred at the customer client device 160, an identifier of the public vendor key used to encrypt the double encrypted key, an identifier of the public provider key used to encrypt the double encrypted key, a TEE or TEE partition identifier, or other associated information that identifies the customer or the client device 160, for example. This metadata may be relied upon by the provider computing environment 110 in certain aspects as described in further detail below. In various embodiments, the client device 160 may generate a signature of the metadata or sign the metadata using a key, so that the provider computing environment 110 can verify that the metadata was provided by the client device 160.

After the customer client device 160 transmits the double encrypted secret material and/or metadata to the provider computing environment 110 at reference 410, the provider computing environment 110 extracts and stores the secret material. The provider computing environment 110 then transmits a confirmation that the secret material has been extracted and stored, as further described below with reference to FIG. 5. This confirmation is received by the customer client device 160 at reference 412.

Once the client device 160 is certain that the secret material have been transferred to the provider computing environment 110, the customer client device 160 is ready to transmit cryptographic operation instructions to the provider computing environment 110. Thus, at some time after reference 412, the client device 160 transmits one or more cryptographic operation instructions to the provider computing environment 110 at reference 412. That is, after the customer's secret material has been securely transferred to and stored by the provider computing environment 110, the customer client device 160 is free to transmit instructions for the performance of various cryptographic operations on its behalf. In turn, the provider computing environment 110 processes the cryptographic operations with secret material provided by the customer client device 160 using the TEE 130, without ever being exposed to the secret material it operates with.

FIG. 5 illustrates an example process flow 500 of the secret services engine 140 and the TEE 130 in the networked environment 100 of FIG. 1 according to various embodiments of the present disclosure. Although the process flow 500 is described below in connection with the secret services engine 140 and the TEE 130 of the provider computing environment 110, it is noted that the process flow 500 may be performed by other computing environments or devices.

Starting at reference 502, the provider computing environment 110 receives double encrypted secret material from the customer client device 160. For example, the double encrypted secret material may comprise the customer key K1 encrypted by both the public vendor key $K_{PubVendor}$ and the public provider key $K_{PubProvider}$, according to the example of FIG. 2A. In another embodiment, the provider computing environment 110 receives encrypted revocation data and secret material from the customer client device 160. For example, the encrypted revocation data and secret material may comprise the revocation data R and the customer key K1 encrypted by both the public vendor key $K_{PubVendor}$ and the public provider key $K_{PubProvider}$, according to the example of FIG. 3A.

At reference 502, the provider computing environment 100 may also receive metadata associated with the received double encrypted key. The metadata may include an identifier that certain validations have occurred at the customer client device 160, an identifier of the public vendor key used to encrypt the double encrypted key, an identifier of the public provider key used to encrypt the double encrypted key, a TEE or TEE partition identifier to be used to decrypt and store secret material, or other associated information that identifies the customer or the client device 160, for example. This metadata is relied upon by the provider computing environment 110 in certain aspects discussed below. To verify that the metadata was provided from a certain customer, the metadata may be signed by the customer client device 160, and the provider computing environment 110 may verify the signature of the client device 160 before operating with the metadata.

In one embodiment, at reference 504, the secret services engine 140 decrypts the double encrypted secret material with the private provider key, to provide a vendor encrypted key as a result. In other words, at reference 504, the secret services engine 140 extracts vendor encrypted secret material from the double encrypted secret material by decrypting the double encrypted secret material with the private provider key. The decryption at reference 504 may be accomplished according to the examples described in connection with FIG. 2B.

When extracting the vendor encrypted secret material at reference 504, the secret services engine 140 may also import the vendor encrypted secret material into the TEE 130. Particularly, the secret services engine 140 may import the vendor encrypted secret material into the TEE 130 using a standard API protocol of the TEE 130. It is further noted that, according to the examples described in connection with FIG. 3B, the secret services engine 140 may additionally decrypt or extract any encrypted revocation data using the private provider key at reference 504, to provide vendor encrypted revocation data as a result. The vendor encrypted revocation data may also be imported into the TEE 130 by the secret services engine 140.

In another embodiment, at reference 504, the secret services engine 140 imports the double encrypted secret material into the TEE 130, and directs the TEE 130 to decrypt the double encrypted secret material with the private provider key, to provide the vendor encrypted secret material as a result. For example, the decryption or extraction at reference 504 may be accomplished according to the examples described in connection with FIG. 3C. It is further noted that the secret services engine 140 may additionally direct the TEE 130 to decrypt or extract any received encrypted revocation data at reference 504.

At reference 506, the secret services engine 140 directs the TEE 130 to decrypt the vendor encrypted secret material with the private vendor key, to provide the customer secret material as a result. Further, at reference 506, the secret services engine 140 directs the TEE 130 to store the customer secret material. The secret services provider 140 may also direct the TEE 130 to decrypt any vendor encrypted revocation data with the private vendor key, and store the revocation data. As one example, the generation and storage of the customer secret material and/or the revocation data may be accomplished according to the examples of FIGS. 2B, 3B, and 3C, as described above.

The extraction at references 504 and 506 may be based upon, in certain aspects, metadata received at reference 502. For example, the metadata received at reference 502 may include an identifier of the provider and vendor keys to be used for decryption at references 504 and 506. The metadata may also specify a certain TEE to be used for decryption, and a partition of a TEE to store a customer's extracted secret material and/or revocation data.

Here, it is noted that the extraction and storage of the customer secret material and/or the revocation data at reference 506 is accomplished without the provider computing environment 110 being exposed or having access to the customer secret material and/or the revocation data.

At reference 508, the provider computing environment 110 confirms the extraction and storage of the secret material received at reference 502. This confirmation may be by way of transmission of a confirmation to the customer client device 160, specifying that the secret material received at reference 502 has been securely stored.

With the secret data securely transferred and stored within the TEE 130 of the provider computing environment 110, the provider computing environment 110 is ready to receive a cryptographic operation instruction from the customer client device 160 at reference 510. For example, the provider computing environment 110 may receive a cryptographic operation instruction to decrypt, translate, hash, sign, or validate a signature. It is noted that the cryptographic operation instruction received at reference 510 may be received along with an operation identifier of the cryptographic operation to be performed, a key identifier of a key to be used during the cryptographic operation, and/or TEE and TEE partition identifiers. At reference 512, the secret services engine 140 directs the TEE 130 to perform the cryptographic operation as specified by the instruction received at reference 510.

At some point during or after the performance of the cryptographic operation at reference 510, the provider computing environment 110 may forward a result of the operation to the customer client device 160 or any other specified network location. In this manner, the customer client device 160 may rely upon the provider computing environment 110 to process cryptographic instructions on its behalf. Further, it is noted that a customer that relies upon the provider computing environment 110 to process cryptographic instructions does not need to expose any secret key information or material to the provider computing environment 110. It is also noted that, in some embodiments, one or more revocation checks are performed based on any received revocation data, to determine whether a customer key is still active and valid for use. For example, before processing a cryptographic operation at reference 510, the revocator 138 of the trusted execution environment 130 may perform a revocation check call to determine whether a specified customer key is still active and valid for use, as discussed above. If the revocation check call identifies that a specified customer key has been revoked, the revocator 138 revokes the secret customer key for use by the trusted execution environment 130.

Figure 6:
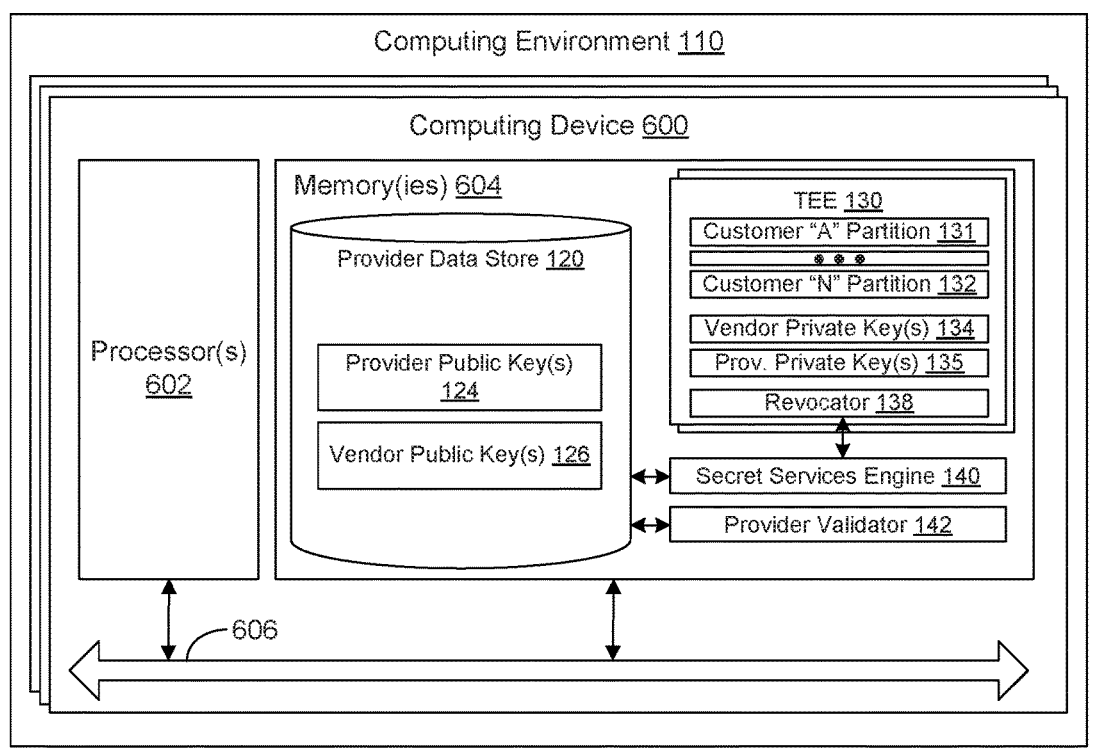
FIG. 6 illustrates an example schematic block diagram of the computing environment employed in the networked environment of FIG. 1 according to various embodiments of the present disclosure.

FIG. 6 illustrates an example schematic block diagram of the provider computing environment 110 employed in the networked environment 100 of FIG. 1 according to various embodiments. The provider computing environment 110 includes one or more computing devices 600. Each computing device 600 includes at least one processing system, for example, having a processor 602 and a memory 604, both of which are electrically and communicatively coupled to a local interface 606. To this end, each computing device 600 may comprise, for example, at least one server computer or similar device. The local interface 606 may comprise, for example, a data bus with an accompanying address/control bus or other bus structure as can be appreciated.

In various embodiments, the memory 604 stores data and software or executable-code components executable by the processor 602. For example, the memory 604 may store executable-code components associated with the TEE 130, the secret services engine 140, and the logical elements thereof, for execution by the processor 602. The memory 604 may also store data such as that stored in the private data store 120, among other data.

It should be understood and appreciated that the memory 604 may store other executable-code components for execution by the processor 602. For example, an operating system may be stored in the memory 604 for execution by the processor 602. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

As discussed above, in various embodiments, the memory 604 stores software for execution by the processor 602. In this respect, the terms "executable" or "for execution" refer to software forms that can ultimately be run or executed by the processor 602, whether in source, object, machine, or other form. Examples of executable programs include, for example, a compiled program that can be translated into a machine code format and loaded into a random access portion of the memory 604 and executed by the processor 602, source code that can be expressed in an object code format and loaded into a random access portion of the memory 604 and executed by the processor 602, or source code that can be interpreted by another executable program to generate instructions in a random access portion of the memory 604 and executed by the processor 602, etc. An executable program may be stored in any portion or component of the memory 604 including, for example, a random access memory (RAM), read-only memory (ROM), magnetic or other hard disk drive, solid-state, semiconductor, or similar drive, USB flash drive, memory card, optical disc (e.g., compact disc (CD) or digital versatile disc (DVD)), floppy disk, magnetic tape, or other memory component.

In various embodiments, the memory 604 may include both volatile and nonvolatile memory and data storage components. Volatile components are those that do not retain data values upon loss of power. Nonvolatile components are those that retain data upon a loss of power. Thus, the memory 604 may comprise, for example, a random access memory (RAM), read-only memory (ROM), magnetic or other hard disk drive, solid-state, semiconductor, or similar drive, USB flash drive, memory card accessed via a memory card reader, floppy disk accessed via an associated floppy disk drive, optical disc accessed via an optical disc drive, magnetic tape accessed via an appropriate tape drive, and/or other memory component, or any combination thereof. In addition, the RAM may comprise, for example, a static random access memory (SRAM), dynamic random access memory (DRAM), or magnetic random access memory (MRAM), and/or other similar memory device. The ROM may comprise, for example, a programmable read-only memory (PROM), erasable programmable read-only memory (EPROM), electrically erasable programmable read-only memory (EEPROM), or other similar memory device.

Also, the processor 602 may represent multiple processors 602 and/or multiple processor cores and the memory 604 may represent multiple memories that operate in parallel, respectively, or in combination. Thus, the local interface 606 may be an appropriate network or bus that facilitates communication between any two of the multiple processors 602, between any processor 602 and any of the memories 604, or between any two of the memories 604, etc. The local interface 606 may comprise additional systems designed to coordinate this communication, including, for example, a load balancer that performs load balancing. The processor 602 may be of electrical or of some other available construction.

As discussed above, the TEE 130, the secret services engine 140, and the logical elements thereof may be embodied, in part, by software or executable-code components for execution by general purpose hardware. Alternatively the same may be embodied in dedicated hardware or a combination of software, general, specific, and/or dedicated purpose hardware. If embodied in such hardware, each can be implemented as a circuit or state machine, for example, that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts or process diagrams of FIGS. 4 and 5 are representative of certain processes, functionality, and operations of embodiments discussed herein. Each block may represent one or a combination of steps or executions in a process. Alternatively or additionally, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as the processor 602. The machine code may be converted from the source code, etc. Further, each block may represent, or be connected with, a circuit or a number of interconnected circuits to implement a certain logical function or process step.

Although the flowcharts or process diagrams of FIGS. 4 and 5 illustrate a specific order, it is understood that the order may differ from that which is depicted. For example, an order of execution of two or more blocks may be scrambled relative to the order shown. Also, two or more blocks shown in succession in FIGS. 4 and 5 may be executed concurrently or with partial concurrence. Further, in some embodiments, one or more of the blocks shown in FIGS. 4 and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the TEE 130, the secret services engine 140, and the logical elements thereof that comprise software or executable-code components, can be embodied or stored in any tangible or non-transitory computer-readable medium or device for execution by an instruction execution system such as a general purpose processor. In this sense, the logic may comprise, for example, software or executable-code components that can be fetched from the computer-readable medium and executed by the instruction execution system. Thus, the instruction execution system may be directed by execution of the instructions to perform certain processes such as those illustrated in FIGS. 4 and 5. In the context of the present disclosure, a "computer-readable medium" can be any tangible medium that can contain, store, or maintain any logic, application, software, or executable-code component described herein for use by or in connection with an instruction execution system.

The computer-readable medium can comprise any physical media such as, for example, magnetic, optical, or semiconductor media. More specific examples of suitable computer-readable media include, but are not limited to, magnetic tapes, magnetic floppy diskettes, magnetic hard drives, memory cards, solid-state drives, USB flash drives, or optical discs. Also, the computer-readable medium may comprise a random access memory (RAM) including, for example, a static random access memory (SRAM), dynamic random access memory (DRAM), or magnetic random access memory (MRAM). In addition, the computer-readable medium may comprise a read-only memory (ROM), a programmable read-only memory (PROM), an erasable programmable read-only memory (EPROM), an electrically erasable programmable read-only memory (EEPROM), or other similar memory device.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Therefore, the following is claimed:

1. A non-transitory computer-readable medium having computer-readable instructions stored thereon that, when executed by at least one of one or more computing devices, directs at least one of the one or more computing devices to:
   receive double encrypted revocation data from a customer client device, the double encrypted revocation data being encrypted by public provider and public vendor keys;
   extract vendor encrypted revocation data from the double encrypted revocation data by decrypting the double encrypted revocation data with a private provider key;
   extract revocation data from the vendor encrypted revocation data by decrypting the vendor encrypted revocation data with a private vendor key, the revocation data defining at least one condition of validity for a secret key;
   store the revocation data within a trusted execution environment;
   receive an identifier of the secret key and an instruction to perform a cryptographic operation using the secret key from the customer client device; and
   in response to the instruction, perform a revocation check to determine whether the secret key has been revoked based in part on the identifier and the revocation data.

2. The non-transitory computer-readable medium of claim 1, wherein at least one of the one or more computing devices is further directed to perform, by the trusted execution environment, the cryptographic operation using the secret key based in part on an outcome of the revocation check.

3. The non-transitory computer-readable medium of claim 1, wherein at least one of the one or more computing devices is further directed to import the double encrypted revocation into the trusted execution environment.

4. The non-transitory computer-readable medium of claim 1, wherein the revocation data specifies a time period during which the secret key is valid.

5. The non-transitory computer-readable medium of claim 1, wherein the revocation data includes a network address and token for access to an interface to perform the revocation check.

6. The non-transitory computer-readable medium of claim 1, wherein at least one of the one or more computing devices is further directed to:
   receive double encrypted secret material from the customer client device;
   import the double encrypted secret material into a trusted execution environment;
   extract vendor encrypted secret material from the double encrypted secret material by decrypting the double encrypted secret material with the private provider key;
   extract secret material from the vendor encrypted secret material by decrypting the vendor encrypted secret material with the private vendor key, the secret material comprising the secret key; and
   store the secret key within the trusted execution environment.

7. A system, comprising:
at least one memory device having computer-readable instructions stored thereon; and
at least one of one or more computing devices directed, through execution of the computer-readable instructions, to:
receive double encrypted revocation data from a customer client device, the double encrypted revocation data being encrypted by public provider and public vendor keys;
extract vendor encrypted revocation data from the double encrypted revocation data by decrypting the double encrypted revocation data with a private provider key;
extract revocation data from the vendor encrypted revocation data by decrypting the vendor encrypted revocation data with a private vendor key, the revocation data defining at least one condition of validity for a secret key;
receive an identifier of the secret key and an instruction to perform a cryptographic operation in a trusted execution environment using the secret key from the customer client device; and
in response to the instruction, perform a revocation check to determine whether the secret key has been revoked based in part on the identifier and the revocation data.

8. The system of claim 7, wherein at least one of the one or more computing devices is further directed to perform, by the trusted execution environment, the cryptographic operation using the secret key based in part on an outcome of the revocation check.

9. The system of claim 7, wherein at least one of the one or more computing devices is further directed to import the double encrypted revocation into the trusted execution environment.

10. The system of claim 7, wherein the revocation data specifies a time period during which the secret key is valid.

11. The system of claim 7, wherein the revocation data includes a network address and token for access to an interface to perform the revocation check.

12. The system of claim 7, wherein at least one of the one or more computing devices is further directed, in response to the revocation check, to revoke the secret key for use by the trusted execution environment when the secret key has been revoked.

13. The system of claim 7, wherein at least one of the one or more computing devices is further directed to:
receive double encrypted secret material from the customer client device;
import the double encrypted secret material into a trusted execution environment;
extract vendor encrypted secret material from the double encrypted secret material by decrypting the double encrypted secret material with the private provider key;
extract secret material from the vendor encrypted secret material by decrypting the vendor encrypted secret material with the private vendor key, the secret material comprising the secret key; and
store the secret key within the trusted execution environment.

14. The system of claim 7, wherein:
the instruction to perform a cryptographic operation includes an operation identifier of the cryptographic operation and an identifier of the secret key; and
at least one of the one or more computing devices is further directed to perform the cryptographic operation in the trusted execution environment based in part on the operation identifier and the identifier of the secret key.

15. The system of claim 7, wherein the cryptographic operation comprises one of or a combination of encrypting, decrypting, translating, hashing, signing, or validating a signature using the secret key.

16. A method, comprising:
receiving, by at least one of one or more computing devices, double encrypted revocation data, the double encrypted revocation data being encrypted by public provider and public vendor keys;
extracting, by at least one of the one or more computing devices, vendor encrypted revocation data by decrypting the double encrypted revocation data with a private provider key;
extracting, by at least one of the one or more computing devices, revocation data by decrypting the vendor encrypted revocation data with a private vendor key using a trusted execution environment, the revocation data defining at least one condition of validity for a secret key; and
in response to receipt of an identifier of the secret key and an instruction to perform a cryptographic operation using the secret key, performing, by at least one of the one or more computing devices, a revocation check to determine whether the secret key has been revoked based in part on the identifier and the revocation data.

17. The method of claim 16, further comprising performing, by the trusted execution environment, the cryptographic operation using the secret key based in part on an outcome of the revocation check.

18. The method of claim 16, further comprising importing, by at least one of the one or more computing devices, the double encrypted revocation into the trusted execution environment.

19. The method of claim 16, wherein the revocation data specifies a time period during which the secret key is valid.

20. The method of claim 16, wherein the revocation data includes a network address and token for access to an interface to perform the revocation check.

* * * * *